US009197500B2

United States Patent
Mason et al.

(10) Patent No.: US 9,197,500 B2
(45) Date of Patent: *Nov. 24, 2015

(54) ROLE BASED SERVER INSTALLATION AND CONFIGURATION

(71) Applicant: Microsoft Corporation, Redmond, WA (US)

(72) Inventors: Andrew T. Mason, Redmond, WA (US); William A. Laing, Bellevue, WA (US); John Macintyre, Seattle, WA (US); Richard A. Pletcher, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/748,398

(22) Filed: Jan. 23, 2013

(65) Prior Publication Data

US 2013/0138784 A1    May 30, 2013

Related U.S. Application Data

(63) Continuation of application No. 12/843,018, filed on Jul. 24, 2010, now Pat. No. 8,370,924, which is a continuation of application No. 11/089,840, filed on Mar. 25, 2005, now Pat. No. 7,793,284.

(51) Int. Cl.
*H04L 12/24* (2006.01)
*G06F 9/44* (2006.01)
(Continued)

(52) U.S. Cl.
CPC .............. *H04L 41/0806* (2013.01); *G06F 8/20* (2013.01); *G06F 8/447* (2013.01); *G06F 8/60* (2013.01); *G06F 8/61* (2013.01); *G06F 8/62* (2013.01); *G06F 8/71* (2013.01); *G06F 9/44505* (2013.01)

(58) Field of Classification Search
CPC .............. G06F 8/60; G06F 8/61; G06F 8/62; G06F 9/44505; G06F 8/447; G06F 8/71; G06F 8/20
USPC ............. 726/17; 713/189, 191; 709/220, 222, 709/229; 717/174, 140, 121
See application file for complete search history.

(56) References Cited

U.S. PATENT DOCUMENTS 5,113,518 A * 5/1992 Durst et al. ...................... 726/29
5,230,052 A * 7/1993 Dayan et al. ...................... 713/2
(Continued)

OTHER PUBLICATIONS

Gurps et al., ("Chapter 7, Roled-based Component Engineering", From Book "Building Reliable Component-Based Software Systems", 2002).*

(Continued)

*Primary Examiner* — Kambiz Zand
*Assistant Examiner* — Tongoc Tran
(74) *Attorney, Agent, or Firm* — Henry Gabryjelski; Kate Drakos; Micky Minhas

(57) ABSTRACT

The described systems and methods are directed at configuring a server based on a selected role. An installation application is configured to install core components in a server where these core components enable the server to perform the basic functions of a network computing device. A role management application is configured to enable a system administrator to select a role for the server and to automatically determine software components associated with the selected role. The role management application is then configured to build the software components and install the components on the server. The role management application is further configured to configure the components for the selected role. The automated installation process performed by the role management application enables a server to be efficiently configured for a particular role without installing other unnecessary components unrelated to the role.

18 Claims, 14 Drawing Sheets

(51) Int. Cl.
*G06F 9/445* (2006.01)
*G06F 9/45* (2006.01)

(56) References Cited

U.S. PATENT DOCUMENTS

| | | | |
|---|---|---|---|
| 5,325,532 A * | 6/1994 | Crosswy et al. | 713/2 |
| 5,371,792 A * | 12/1994 | Asai et al. | 705/59 |
| 5,418,918 A * | 5/1995 | Vander Kamp et al. | 713/2 |
| 5,421,009 A | 5/1995 | Platt | 709/221 |
| 5,459,867 A * | 10/1995 | Adams et al. | 719/321 |
| 5,504,904 A * | 4/1996 | Dayan et al. | 713/1 |
| 5,555,416 A | 9/1996 | Owens et al. | 717/178 |
| 5,894,571 A | 4/1999 | O'Connor | 713/2 |
| 6,418,554 B1 * | 7/2002 | Delo et al. | 717/174 |
| 6,594,700 B1 * | 7/2003 | Graham et al. | 709/230 |
| 6,823,373 B1 * | 11/2004 | Pancha et al. | 709/219 |
| 6,868,454 B1 * | 3/2005 | Kubota et al. | 709/237 |
| 6,944,857 B1 | 9/2005 | Glaser et al. | 717/173 |
| 6,957,186 B1 * | 10/2005 | Guheen et al. | 705/323 |
| 7,103,681 B2 * | 9/2006 | Coulombe | 709/246 |
| 7,380,025 B1 | 5/2008 | Riggins et al. | 710/8 |
| 8,732,182 B2 * | 5/2014 | Bethlehem et al. | 707/758 |
| 8,762,505 B2 * | 6/2014 | Kutan et al. | 709/222 |
| 8,762,938 B2 * | 6/2014 | Calvin | 717/108 |
| 8,769,482 B2 * | 7/2014 | Batey et al. | 717/104 |
| 2002/0129356 A1 * | 9/2002 | Hellerstein et al. | 717/177 |
| 2002/0147801 A1 * | 10/2002 | Gullotta et al. | 709/223 |
| 2002/0194584 A1 * | 12/2002 | Suorsa et al. | 717/176 |
| 2003/0018964 A1 * | 1/2003 | Fox et al. | 717/177 |
| 2003/0037044 A1 * | 2/2003 | Boreham et al. | 707/3 |
| 2003/0115196 A1 * | 6/2003 | Boreham et al. | 707/4 |
| 2003/0126137 A1 * | 7/2003 | McFadden | 707/100 |
| 2003/0196080 A1 * | 10/2003 | Karman | 713/150 |
| 2004/0024732 A1 * | 2/2004 | Klisch et al. | 707/1 |
| 2005/0125509 A1 | 6/2005 | Ramachandran | 709/220 |
| 2005/0207432 A1 * | 9/2005 | Velez-Rivera et al. | 370/401 |

OTHER PUBLICATIONS

Hildmann et al., "Managing Trust betwen collaborating Companies using outsourced Role Based Access Control", ACM, 1999, pp. 105-111.

Linn et al., Attribute Certification: An Enabling Technology for Delegation and Role-Based Controls in Distributed Environments, ACM 1999, pp. 121-130.

Thomas, R., "Role-Based Access Control and Distributed Object-Based Enterprise Computing", Odyssey Research Associates, ACM, RBAC Workshop, 1996, pp. II_99-II 102.

* cited by examiner

ROLE BASED SERVER INSTALLATION AND CONFIGURATION

RELATED APPLICATIONS

This application is a continuation of and claims benefit from U.S. Pat. No. 8,370,924, that was granted Feb. 5, 2013, and that is a continuation of U.S. Pat. No. 7,793,284, that was granted Sep. 7, 2010, each of which is incorporated herein by reference in its entirety.

BACKGROUND

Configuring a server can be a labor intensive and challenging process. It is often necessary to employ a specialized Information Technology (IT) professional to correctly install and configure software components to provide the desired functionality on the server. Recently, universal server software, such as current versions of MICROSOFT® WINDOWS® Server, includes user-friendly installation utilities that enable a generalized IT administrator to install and configure a server. Universal server software is capable of configuring a server to perform a variety of different functions. However, this type of software typically requires components for most of the available functionality to be installed at all times. It may be possible for an IT administrator to disable some components of the software that are not needed for the desired functionality. However, disabling the right components requires a special understanding of the services that make up the desired functionality and which services can safely be disabled. Also, in many cases, an unwanted service can only be disabled. The actual binaries that make up the service are still installed on the hard drive and need to be patched, even though the service is not actually being used by the server operating system.

An effective solution for configuring a server that enables only the necessary components for a desired functionality to be installed without requiring specialized knowledge about the server software continues to elude those skilled in the art.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The systems and methods described herein are directed at configuring a server based on a selected role. An installation application is configured to install core components in a server where these core components enable the server to perform the basic functions of a network computing device. A role management application is configured to enable a system administrator to select a role for the server and to automatically determine software components associated with the selected role. The role management application is then configured to build the software components and install the components on the server. The role management application is further configured to configure the components for the selected role. The automated installation process performed by the role management application enables a server to be efficiently configured for a particular role without installing other unnecessary components unrelated to the role. Also, since only the software components related to the role are installed, the system administrator does not have to update and maintain components that are not used by the server.

Figure 1:
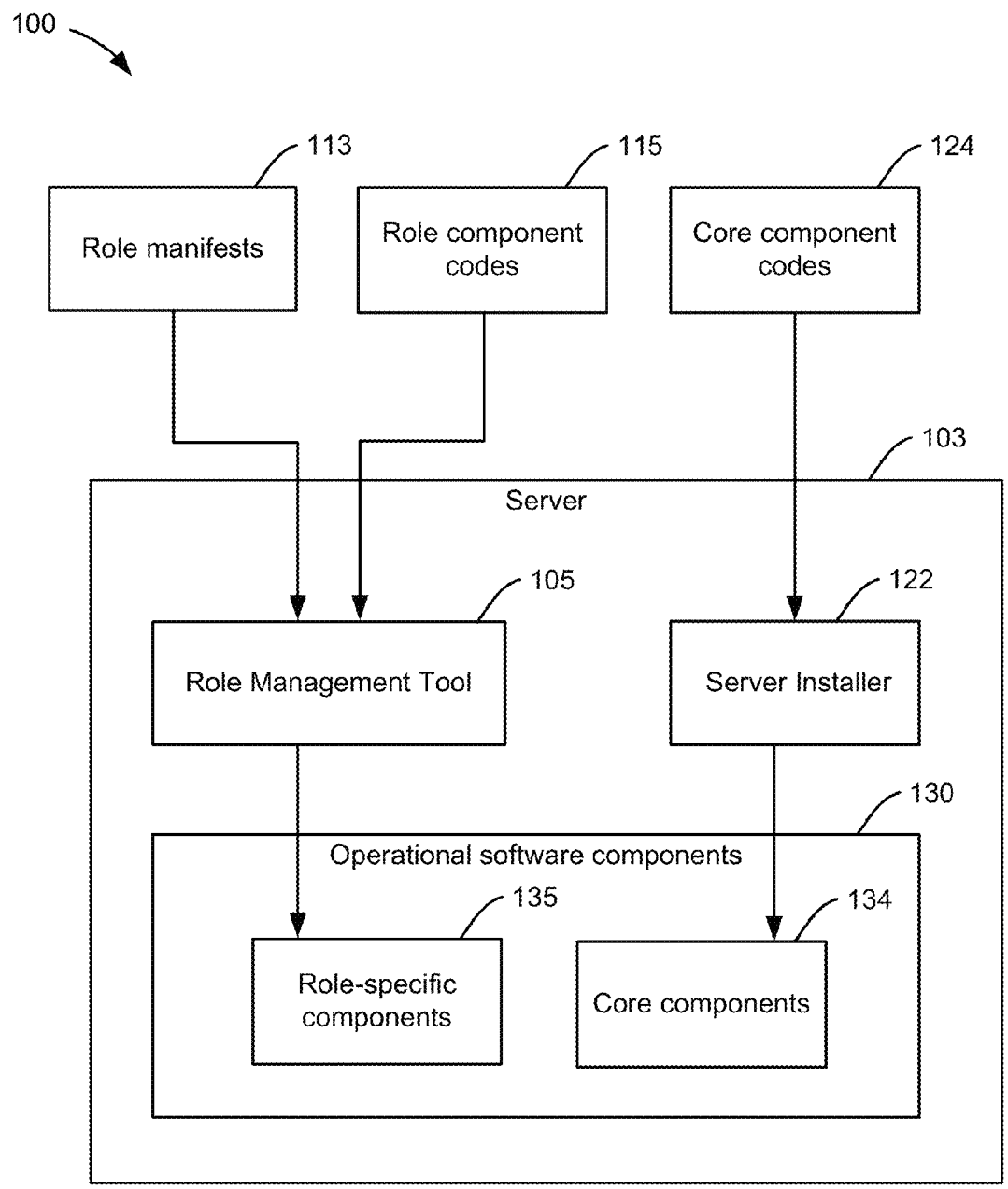
FIG. 1 shows an example system for installing and configuring software components on a server based on the role of the server.

FIG. 1 shows an example system 100 for installing and configuring software components 130 on a server 103 based on the role of the server. A role of a server includes one or more functions that the server is intended to perform for a particular purpose. Typically, software installation begins by executing server installer 122 on server 103. Server installer 122 is a computer-executable component configured to identify core component codes 124 and to build operational core components 134 from the codes. Server installer 122 is also configured to install and configure core components 134 in server 103. Core components 134 are components used by server 103 to perform the basic functions of a network server device. These basic functions may include file handling, security, TCP/IP communication, network access, or the like. Core components 134 may be used by server 103 to perform other role-specific functions.

Role management tool 105 is a computer-executable component designed to configure server 103 for one or more roles. For example, role management tool 105 may be used to configure a new server for a role after core components have been installed by server installer 122. Role management tool 105 may also be used to modify an existing role installation or to uninstall an existing role on the server.

Particularly, role management tool 105 is configured to enable the selection of a role for server 103 and to identify role component codes 115 associated with the selected role. Role management tool 105 is also configured to install role-specific components 135 from role component codes 115 and to configure role-specific components 135 in server 103. Role-specific components are configured to perform the functions for server 103 related to particular roles.

Role component codes 115 include binary codes that are used to build components for different roles that can be performed by server 103. Typically, only a portion of role component codes 115 is used by role management tool to build a role-specific component for each role. To configure server 103 for a particular role, role management tool typically identifies role manifests 113 corresponding to the particular role and uses the information in the corresponding role manifest to build up and configure the role-specific components. Role manifests 113 typically identify the specific portion of role-specific component codes that is used to build the role specific components for each role and information for configuring the role specific components for the role. Typically, each of the role manifests 113 only identifies components that are required by a particular role. Thus, components that are not required by the role are not installed. Role manifests 113 also include information for uninstalling or removing the components for the roles. Role manifests 113 may be implemented as any type of data structure, such as XML data files.

Role management tool 105 may access role component codes 115 from a computer-readable medium, such as an installation disk, an installation file on a network, or the like. Role management tool 105 may be configured to provide a user interface for a user, such as a system administrator, to select a role for server 103. Role management tool 105 then automatically installs components associated with the selected role. To enable customization, role management tool 105 may provide components and preferences associated with the role for selection by the user. It is to be understood that role management tool 105 is typically configured to provide for selection only those components and preferences that are relevant to the selected role. Thus, a system administrator does not have to have specialized knowledge to independently determine what components are necessary to implement the desired role.

Role management tool 105 may be configured to assess and track the state of installed roles. For example, role management tool 105 may determine whether a given role is installed already or not. Role management tool 105 may also prevent the installation of components or sub-components that may destabilize the installed server roles.

Role management tool 105 may also be configured to include an entry in the registry of server 103 to identify the installation of a rule. The entry enables role management tool 105 to identify the roles in server 103 and to locate the components associated with the role. Role management tool 105 may use the information to uninstall or modify the components associated with the role.

Role management tool 105 may also be configured to identify potential problems associated with a role installation on a server. For example, rule management tool 105 may determine the impact the role installation would have on existing applications in the server. A system administrator may use this information to modify the role installation or the existing applications to resolve any identified problems.

Figure 2:
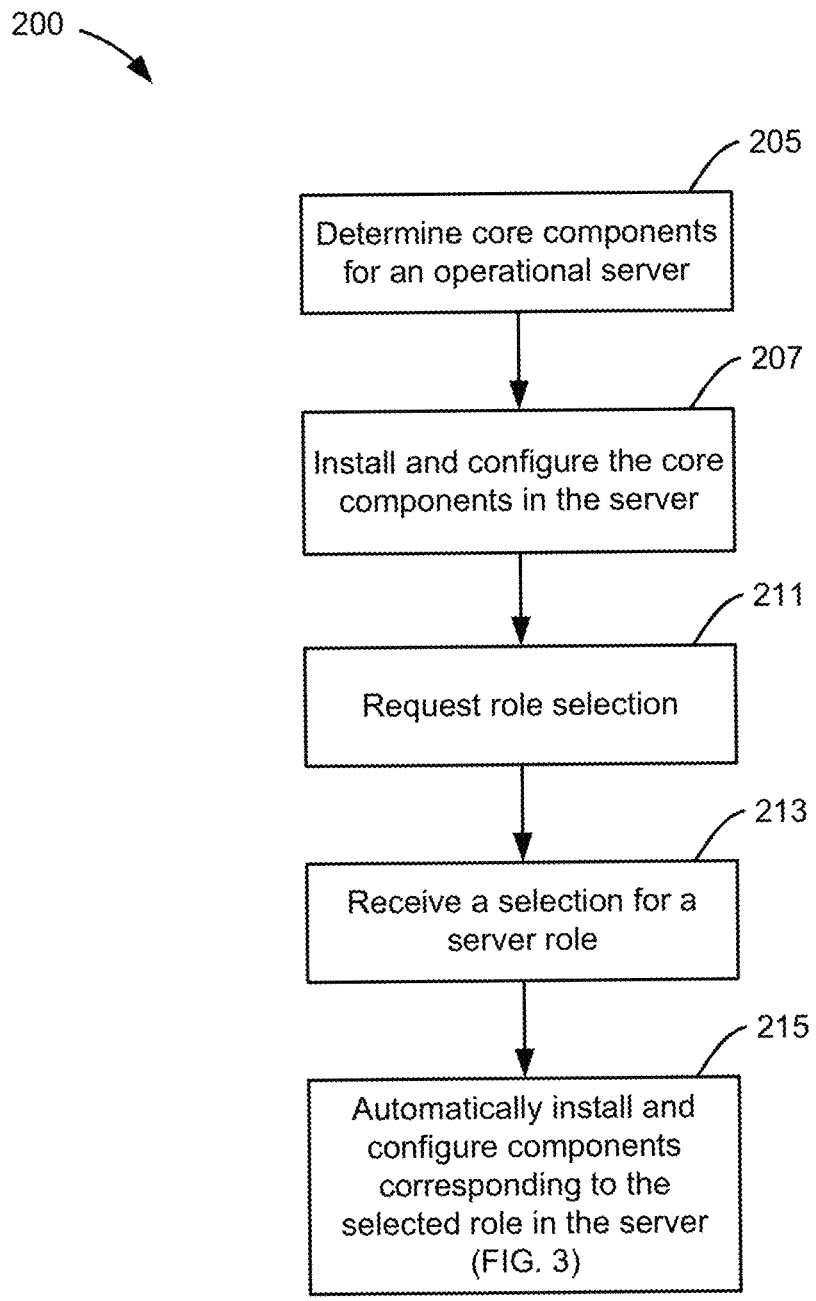
FIG. 2 shows an example process for configuring a server for a role.

FIG. 2 shows an example process 200 for configuring a server for a role. For example, process 200 may be implemented by a software management application, such as a server installer, a role management tool, or the like. At block 205, core components for an operational server are determined. At block 207, the core components are installed onto the server and are configured to perform basic operations of the server. For example, a server installer may retrieve relevant codes from a source, such as an installation disc or a network location, and build the core components using the retrieved codes. The server installer may then install and configure the core components in the server.

At block 211, role selection is requested. For example, a role management tool may provide a user-interface for a system administrator to select one or more roles for the server. At block 215, components corresponding to the selected role are automatically installed in the server and are configured. Installation and configuration of role-specific components will be discussed in conjunction with FIG. 3. Briefly stated, the components associated with a selected role are installed and configured without requiring extensive interaction by the system administrator. The role management tool may provide the system administrator with some selections of components that are related to the role. Components that are not associated with the selected role are not installed. Thus, it is not necessary to maintain and update components that are not used by the server to perform the selected role. Also, since the components installation and configuration are automated based on the selection of the role, the system administrator does not have to possess a detailed understanding of the components in order to correctly install and configure the server for the role.

Figure 3:
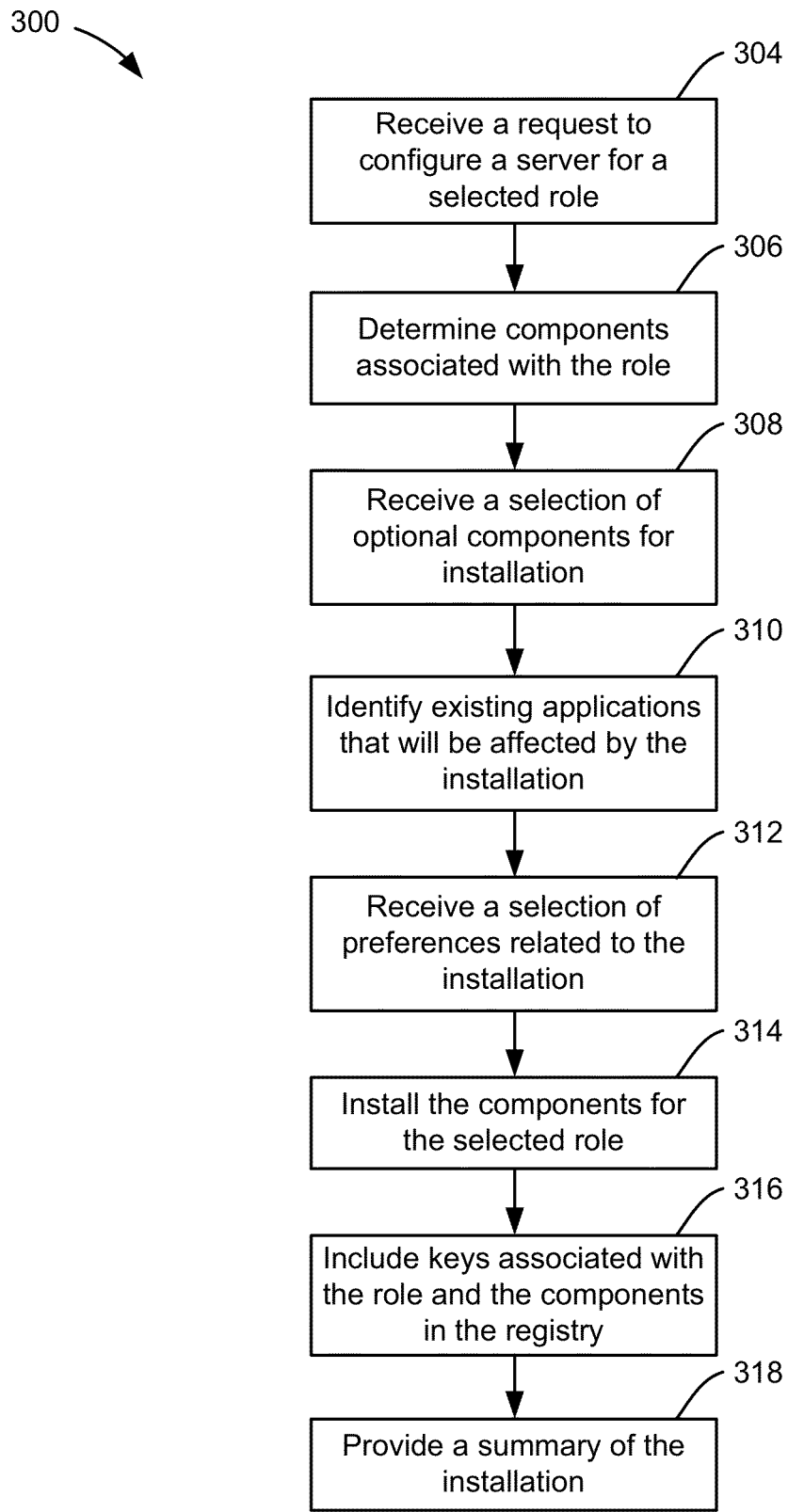
FIG. 3 shows an example process for installing components associated with a role for a server.

FIG. 3 shows an example process 300 for installing components associated with a role for a server. For example, process 300 may be implemented by a role management tool to configure the server for a particular role selected by a system administrator. Process 300 may be repeated to install multiple roles on the server. At block 304, a request to configure a server for a selected role is received. At block 306, components associated with the role are determined. At block 308, the selection of optional server role components for installation is received. These optional components are related to the selected role. At block 310, existing applications that will be affected by the role installation are identified, if any. The step in block 310 may be used for a Terminal Server role. Other roles may not include the step in block 310. At block 312, the selection of preferences related to the role installation is received. At block 314, the components for the selected role are installed. At block 316, keys associated with the role and the components are included in the registry. At block 318, a summary of the installation is provided.

Figure 4:
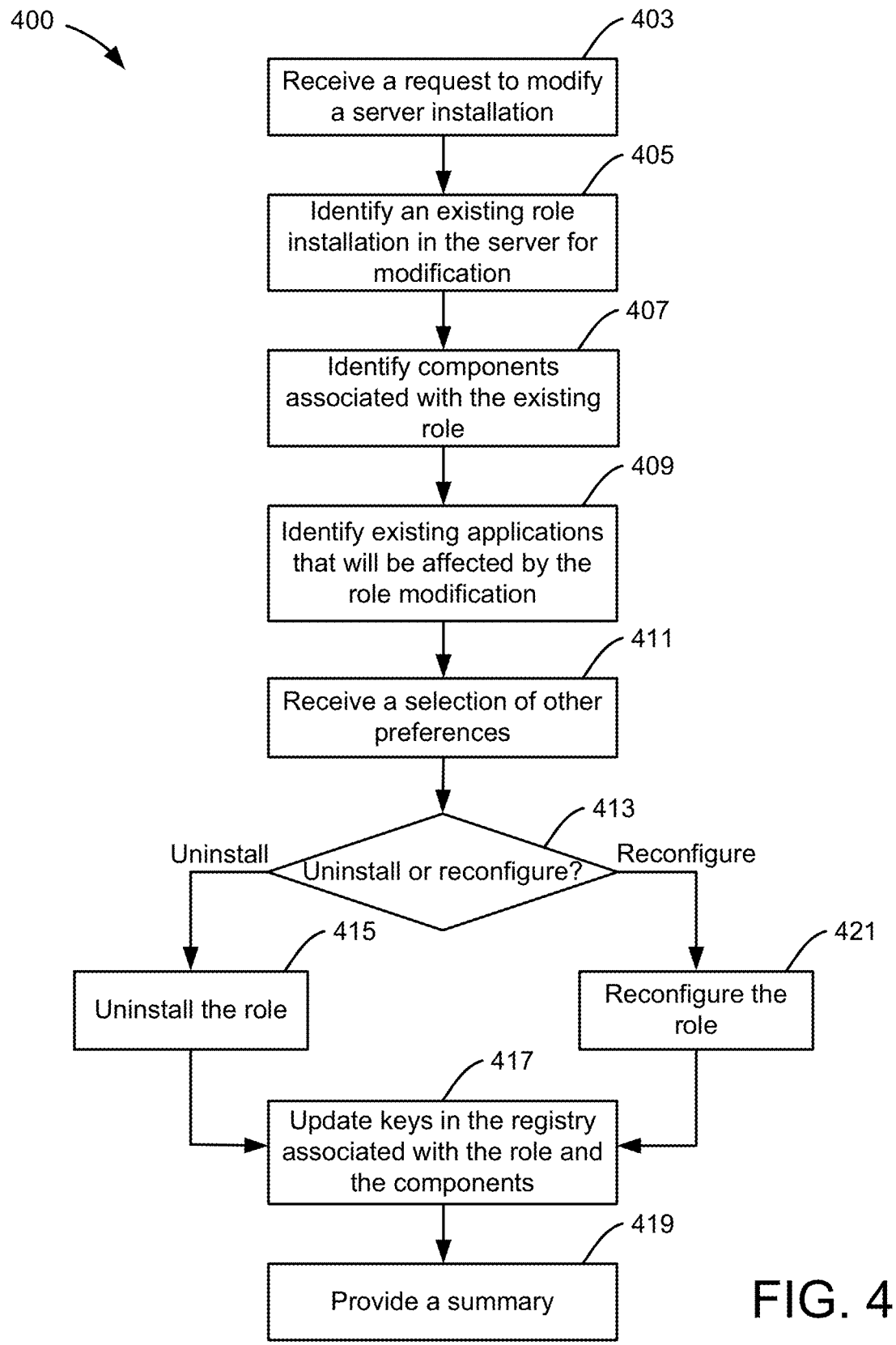
FIG. 4 shows an example process for modifying a server installation.

FIG. 4 shows an example process 400 for modifying a server installation. For example, process 400 may be implemented by a role management tool to uninstall or modify an existing role on a server. At block 403, a request to modify a server installation is received. At block 405, an existing role installation in the server is identified for modification. At block 407, components associated with the existing role are identified. Existing roles and components on a server may be identified from entries in the registry or calls to role APIs. At block 409, existing applications that will be affected by the role modification are identified, if any. At block 411, a selection of options related to the modification is received. At decisional block 413, a determination is made whether to uninstall or reconfigure the role. If the determination is to uninstall the role, process 400 moves to block 415 where the role is uninstalled.

Returning to decision block 413, if the determination is to modify the role, process 400 continues at block 421 where the role is reconfigured as selected. At block 417, keys in the registry associated with the role and the components are updated. At block 419, a summary of the modification is provided.

The following Table 1 shows example roles and example technologies and functionalities associated the roles:

TABLE I

Example roles and technology/functionality associated the roles.

| Role | Technology/Functionality Included |
|---|---|
| Application Server | Interix, COM+, DTC, MSMQ and items from the web server |
| Web Server | FTP, HTTP SSL, IIS Admin, SMTP, WWW Publishing |
| Media Server | Windows Media Services |

TABLE I-continued

Example roles and technology/functionality associated the roles.

| Role | Technology/Functionality Included |
| --- | --- |
| Windows Sharepoint | Document Mgmt, Collaboration, and Platform |
| File | SMB Server, DFS, FRS, Disk Quotas, |
| Print | Print Spooler, TCP/IP Print Server |
| Active Directory Federation Server | Identity and Access Management |
| Directory | Directory, Kerberos KDC, Distributed Link Tracking Server, Intersite Messaging, ESE |
| DHCP | DHCP Server |
| DNS | DNS Server |
| RADIUS | IAS Jet Database Access, Internet Authentication Service |
| VPN | Routing and Remote Access |
| Certificate Server | Certificate service |
| Rights Management Server | RMS Server |
| Terminal Server | TS, Session Directory, TS Licensing |
| Windows Update Services | WUS Server |

Figure 5:
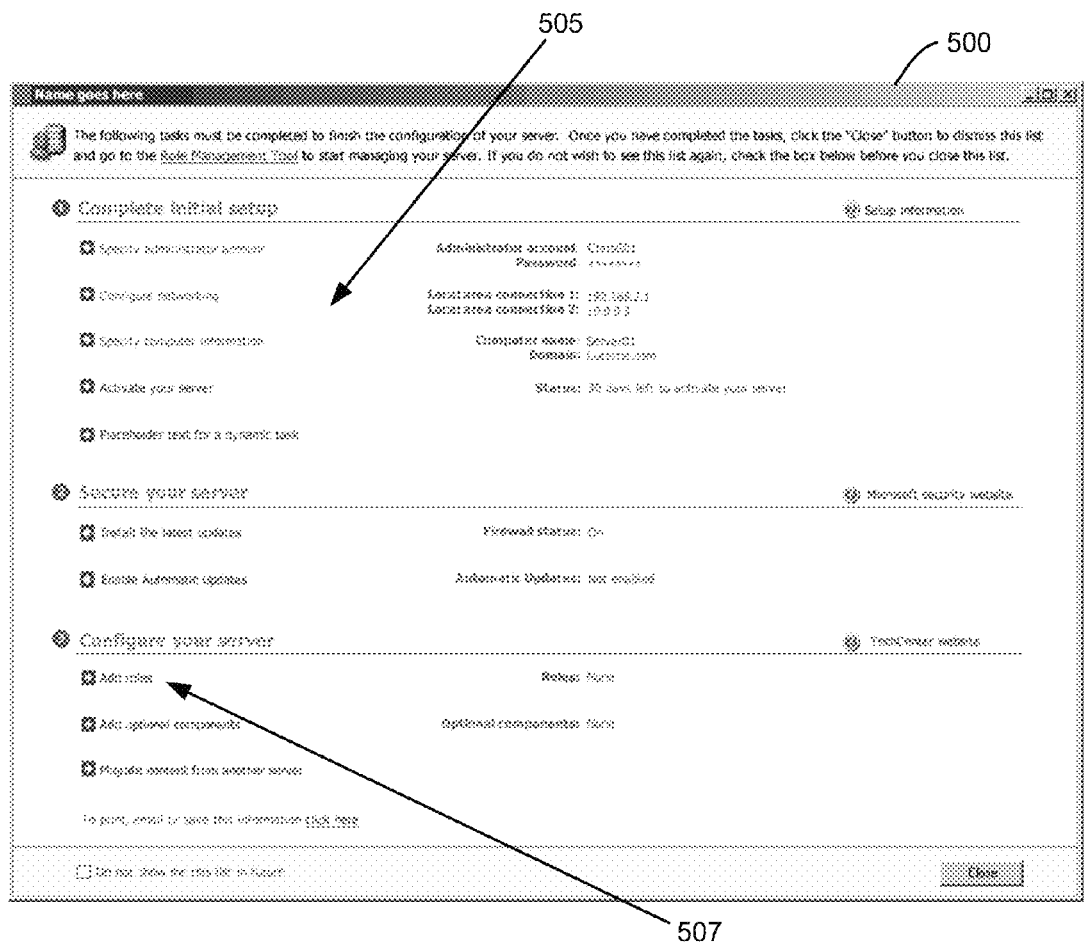
FIG. 5 shows a screenshot of an example user interface for installing and modifying software components in a server.

FIG. 5 shows a screenshot 500 of an example user interface for installing and modifying software components in a server. The example user interface may be provided by a role management tool to enable a system administrator to configure a server for a role. As shown FIG. 5, initial setup for the server has been completed. Screenshot 500 shows that the initial setup has configured the server with basic functionalities, such as administration account specification, network configuration, computer name and domain information, firewall installation, updates installation, or the like.

The user interface also enables the system administrator to configure the server for one or more roles. For example, the administrator may select an add roles trigger 507 to enable the role management tool to automatically add and configure components in the server for the selected role. The role management tool may be configured to ensure that prerequisite components have already been installed before a role and the associated components are installed.

Figure 6:
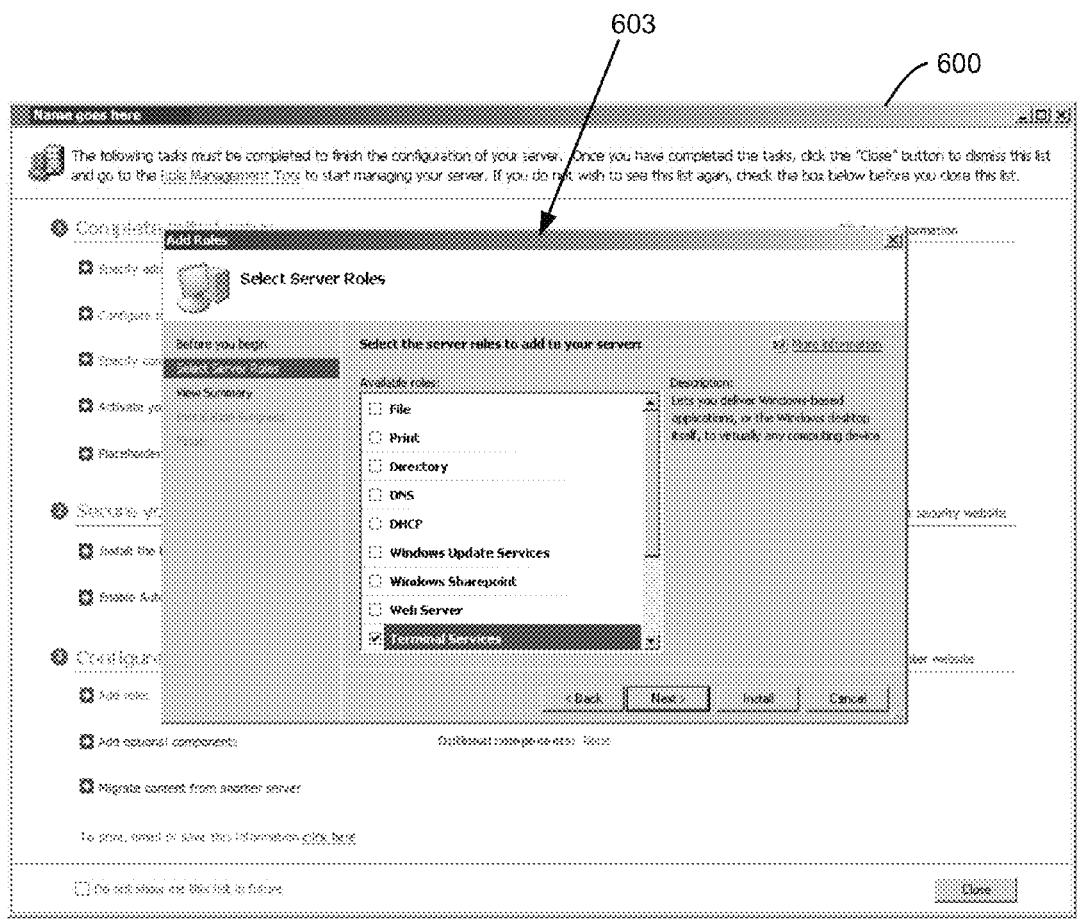
FIG. 6 shows a screenshot of an example user-interface for selecting a role for a server.

FIG. 6 shows a screenshot 600 of an example user-interface for selecting a role for a server. As shown in FIG. 6, a role selection interface 603 is provided when add roles trigger 507 in FIG. 5 is activated. Role selection interface 603 includes roles that can be added to the server. Available roles may include file service, print service, directory service, domain name service (DNS), dynamic host configuration protocol (DHCP) service, update services, Sharepoint, web service, terminal service, or the like. In screenshot 600, the Terminal Service role has been selected.

Figure 7:
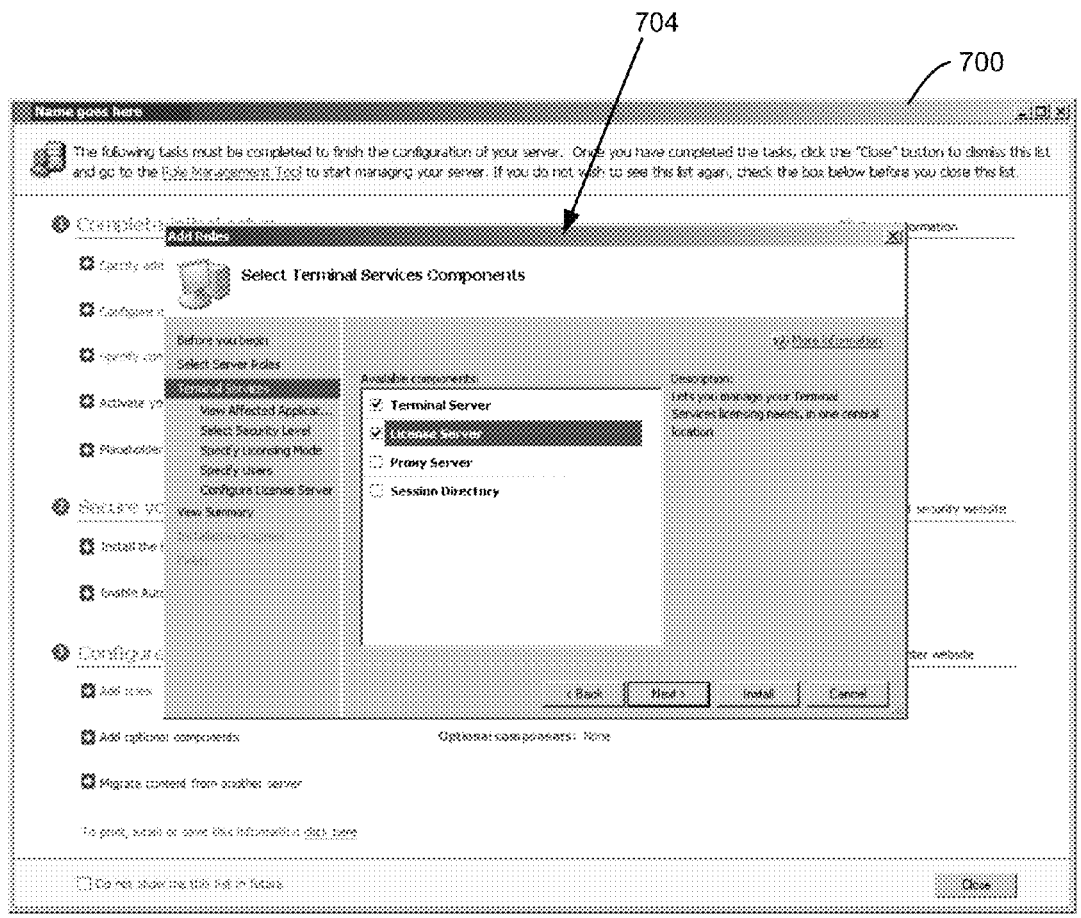
FIG. 7 shows a screenshot of an example user-interface for selecting components for a role.

FIG. 7 shows a screenshot 700 of an example user-interface for selecting components for a role. Screenshot 700 shows a component selection interface 704 that is provided after the selection of the Terminal Service role. As shown in FIG. 7, component selection interface 704 includes components that are related to the Terminal Service role. An administrator may select only components that are needed for the server to perform the desired Terminal Service functions. In screenshot 700, the terminal server component and the license server component are selected.

Figure 8:
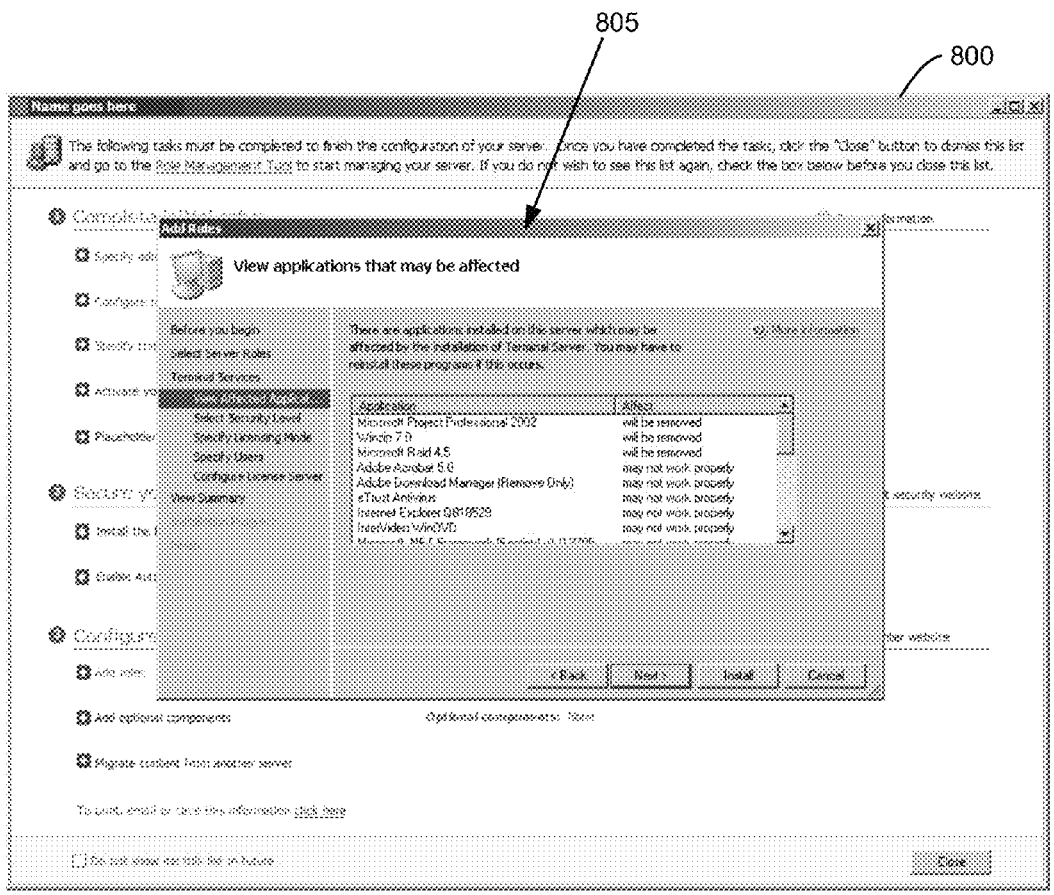
FIG. 8 shows a screenshot of an example user interface for showing information related to installing a role in a server.

FIG. 8 shows a screenshot 800 of an example user interface for showing information related to installing a role in a server. Screenshot 800 shows an application information interface 805 that is provided after a role has been selected to be installed. As shown in FIG. 8, application information interface 805 shows which applications will be affected by the Terminal Service role installation and how these applications will be impacted.

Figure 9:
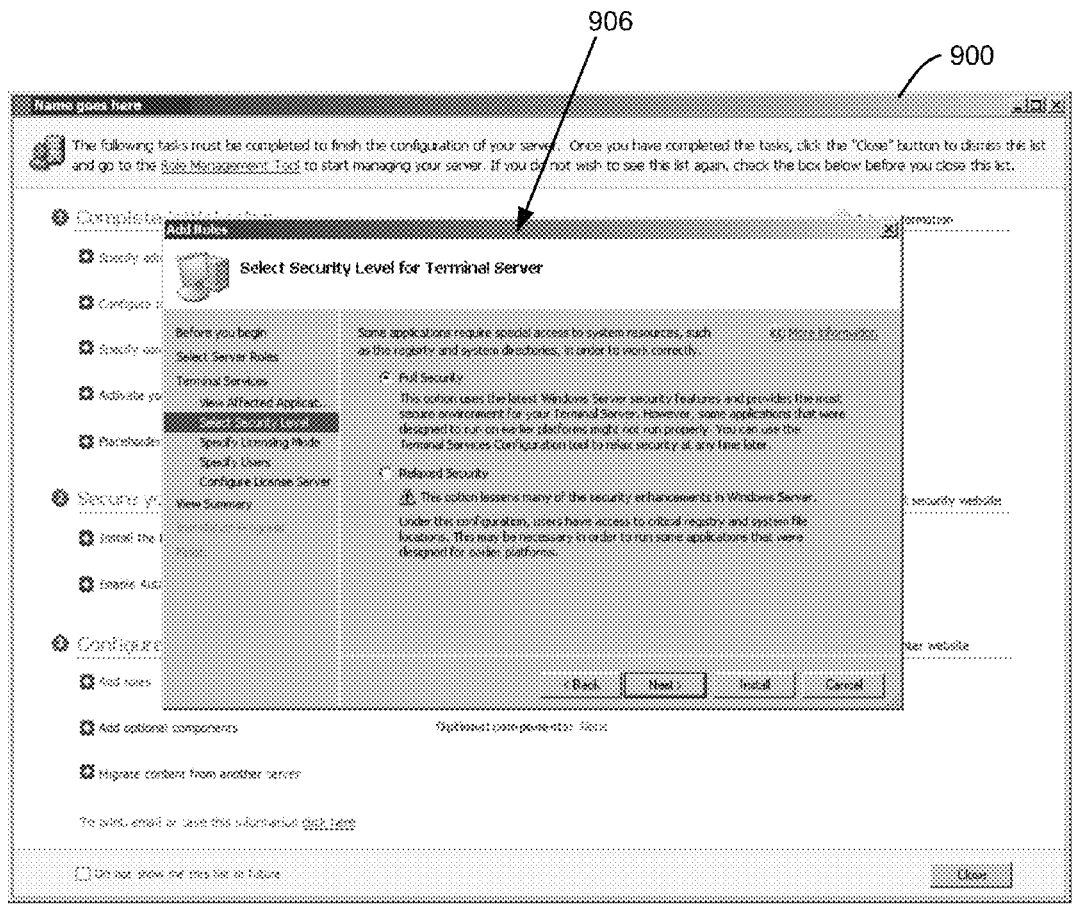
FIG. 9 shows a screenshot of an example user interface to select preferences related to installing a server role.

FIG. 9 shows a screenshot 900 of an example user interface to select preferences related to installing a server role. As shown in FIG. 9, a security selection interface 906 is provided to enable a system administrator to select the security level for the server on which the selected Terminal Service role is to be installed. Other role preferences may also be provided in interfaces similar to interface 906. For example, interfaces may be provided for the system administrator to specify a licensing mode, users, to configure a license server, or the like. Screenshot 900 shows that Full Security is selected for the server with the Terminal Service role.

Figure 10:
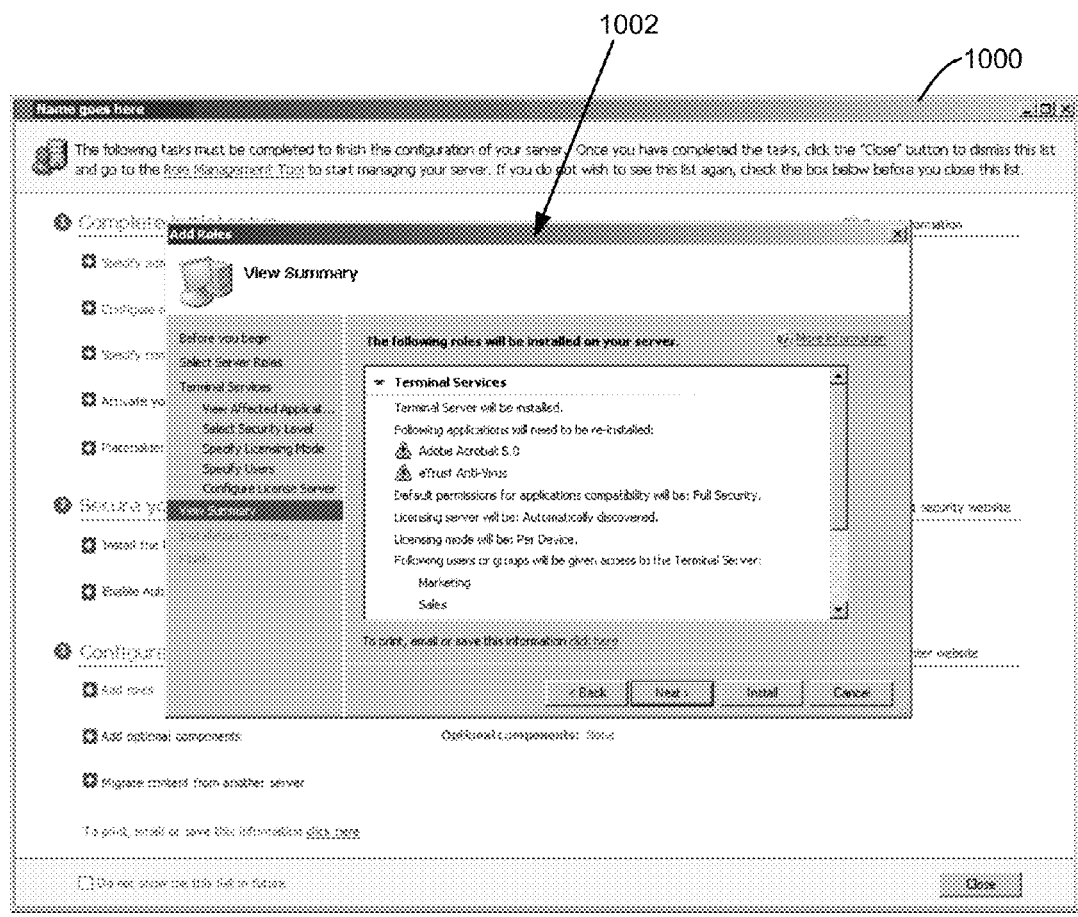
FIG. 10 shows a screenshot of an example user interface for providing a summary of a server role installation.
Figure 11:
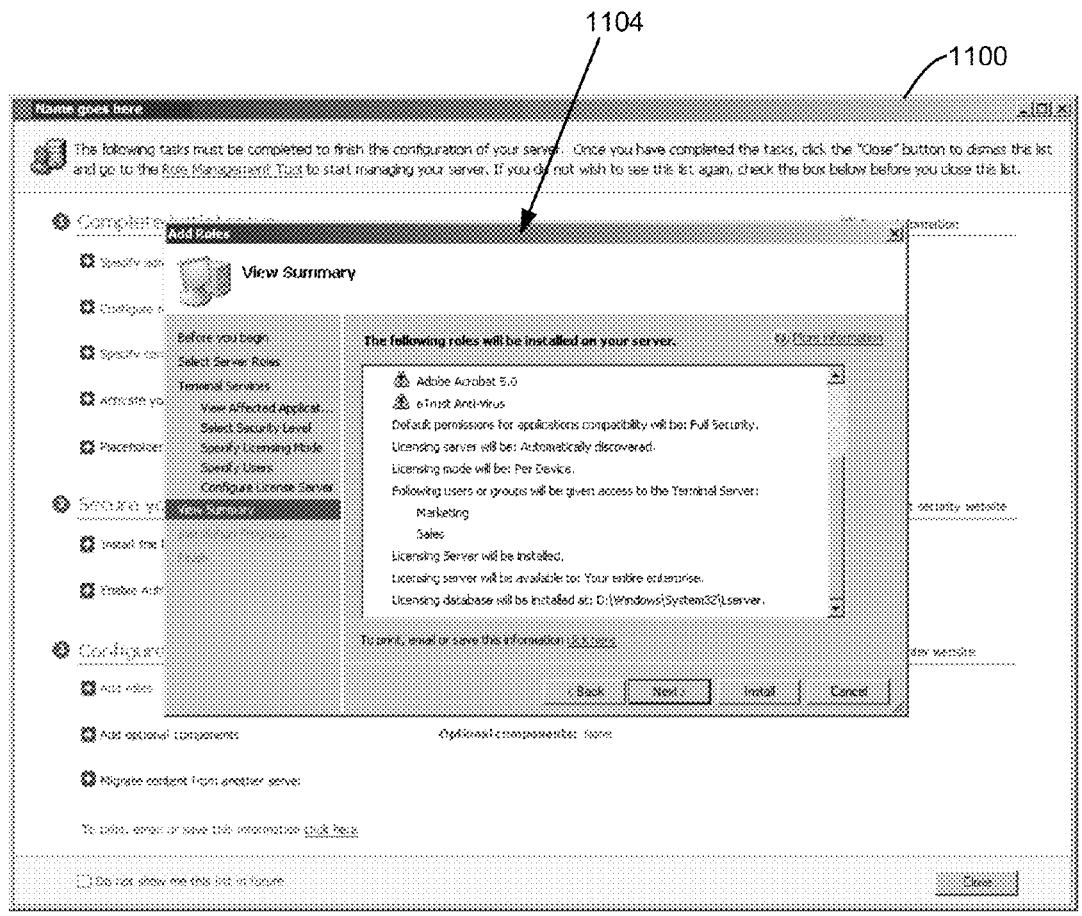
FIG. 11 shows another screenshot of the example user interface shown in FIG. 10.

FIG. 10 shows a screenshot 1000 of an example user interface for providing a summary of a server role installation. As shown in FIG. 10, an installation summary interface 1002 is provided to show significant information about the Terminal Service role installation. Installation summary interface 1002 may be provided before the actual installation process is initiated. A system administrator may confirm the role installation using the information provided in installation summary interface 1002. FIG. 11 shows another screenshot 1104 of the example user interface shown in FIG. 10.

Figure 12:
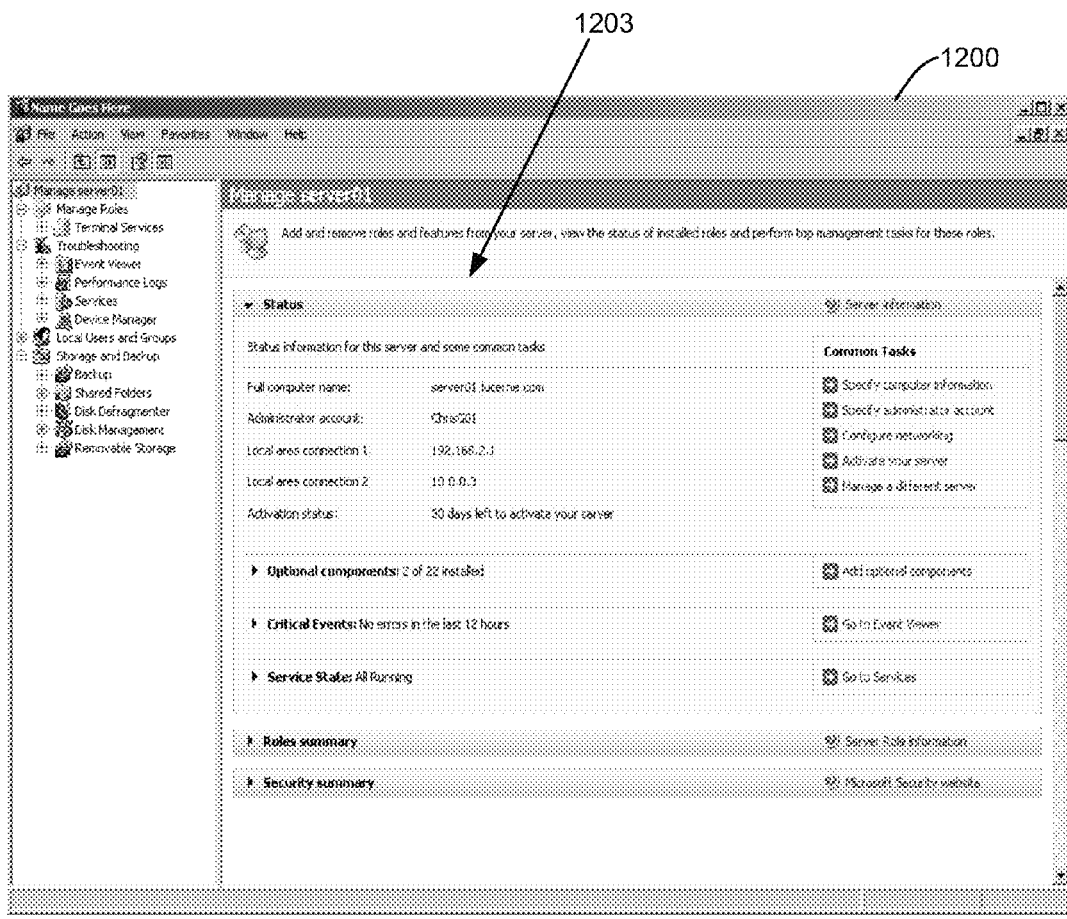
FIG. 12 shows a screenshot of an example user interface for displaying information about a server.

FIG. 12 shows a screenshot 1200 of an example user interface for displaying information about a server. Server management interface 1203 may be provided by a role management tool to display status and configuration data related to a role that has been installed on the server. A system administrator may use server management interface 1203 to modify the installed role.

Figure 13:
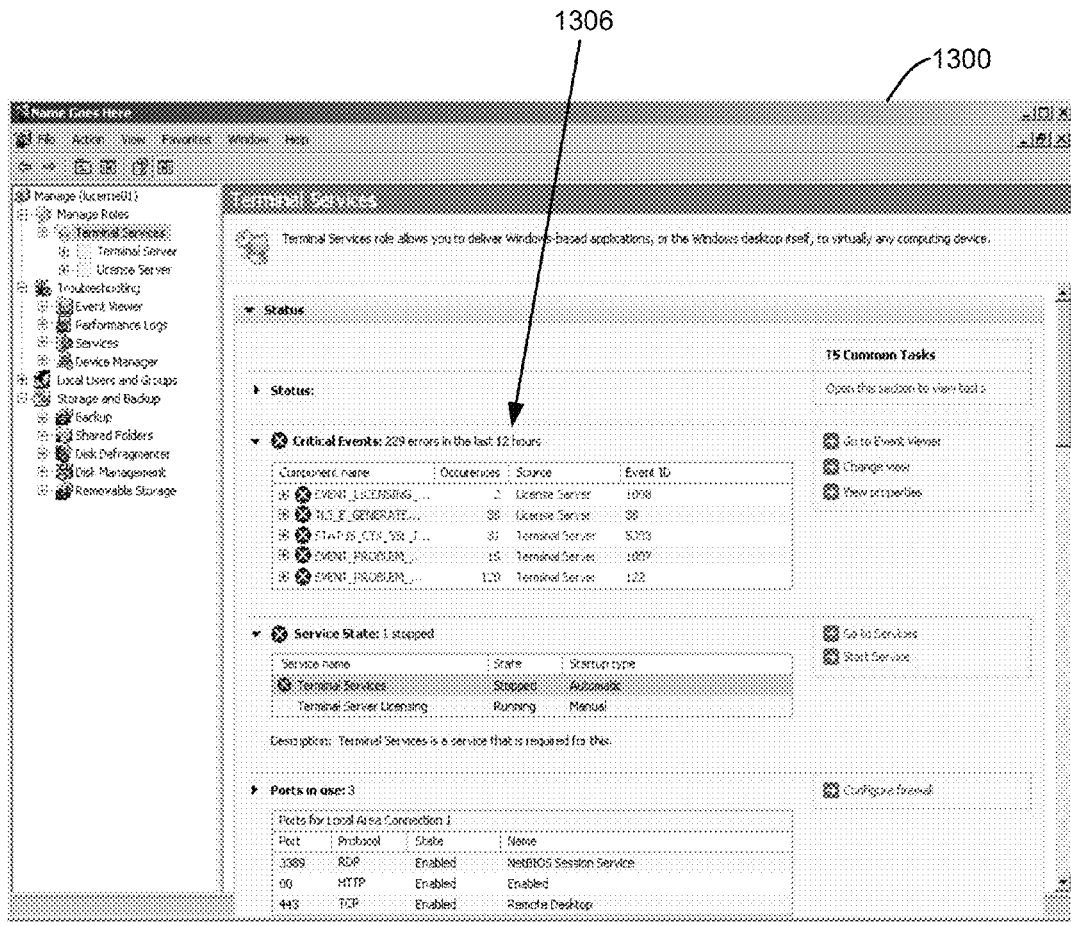
FIG. 13 shows another screenshot of the example user interface shown in FIG. 12.

FIG. 13 shows another screenshot 1300 of the example user interface shown in FIG. 12. As shown in FIG. 13, an installation status area 1306 is provided to display information about the status of a server with a role installation. In screenshot 1300, information, such as critical events, service state, ports that are in use, or the like, are shown in installation status area 1306. A system administrator may use the information to monitor and manage the installed role.

Figure 14:
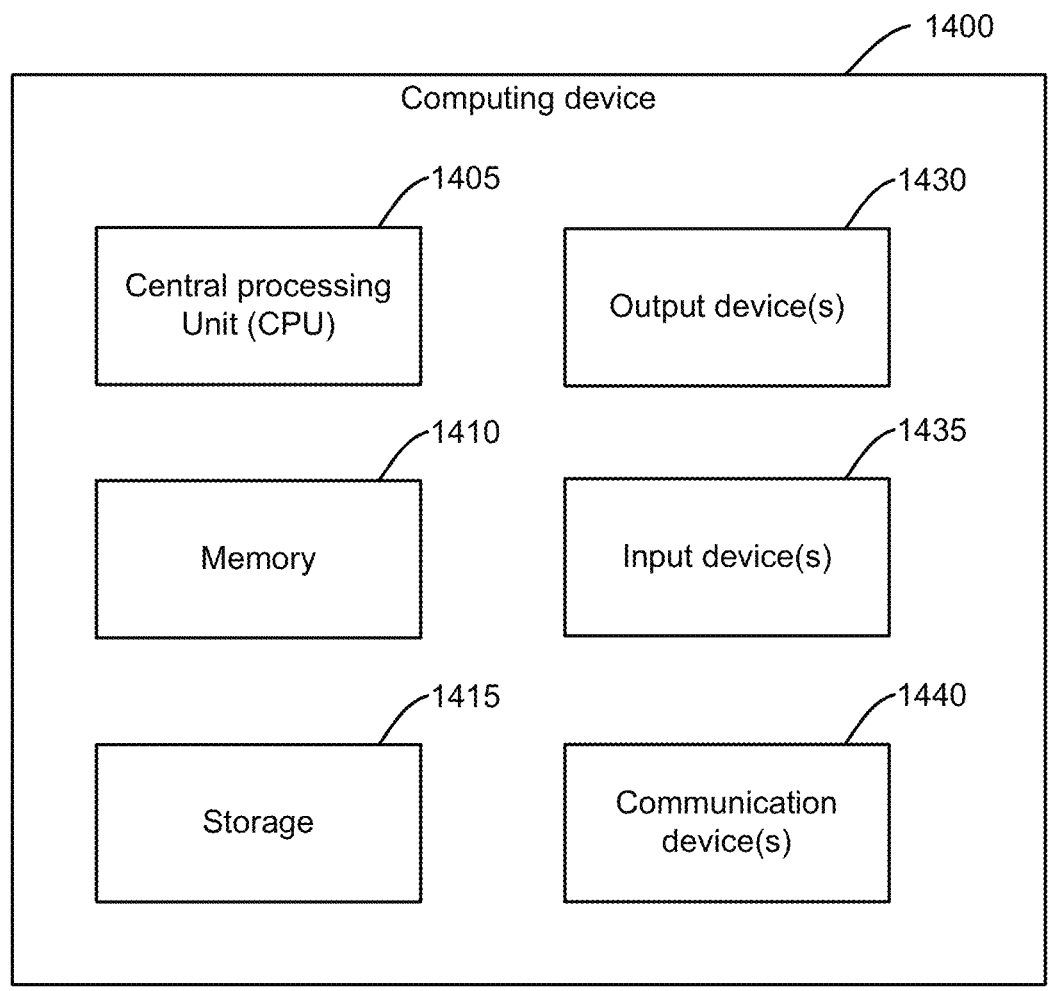
FIG. 14 shows an exemplary computer device for implementing the described systems and methods.

FIG. 14 shows an exemplary comp ter device 1400 for implementing the described systems and methods. In its most basic configuration, computing device 1400 typically includes at least one central processing unit (CPU) 1405 and memory 1410.

Depending on the exact configuration and type of computing device, memory 1410 may be volatile (such as RAM), non-volatile (such as ROM, flash memory, etc.) or some combination of the two. Additionally, computing device 1400 may also have additional features/functionality. For example, computing device 1400 may include multiple CPU's. The described methods may be executed in any manner by any processing unit in computing device 1400. For example, the described process may be executed by both multiple CPU's in parallel.

Computing device 1400 may also include additional storage (removable and/or non-removable) including, but not limited to, magnetic or optical disks or tape. Such additional storage is illustrated in FIG. 14 by storage 1415. Computer storage media includes volatile and nonvolatile, removable and non-removable media implemented in any method or technology for storage of information such as computer readable instructions, data structures, program modules or other data. Memory 1410 and storage 1415 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 1400. Any such computer storage media may be part of computing device 1400.

Computing device 1400 may also contain communications device(s) 1440 that allow the device to communicate with other devices. Communications device(s) 1440 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation communication media includes wired media such as a wired network or direct-wired connection, and wireless media such as acoustic. RF, infrared and other wireless media. The term computer-readable media as used herein includes both computer storage media and communication media. The described methods may be encoded in any computer-readable media in any form, such as data, computer-executable instructions, and the like.

Computing device 1400 may also have input device(s) 1435 such as keyboard, mouse, pen, voice input device, touch input device, etc. Output device(s) 1430 such as a display, speakers, printer, etc. may also be included. All these devices are well know in the art and need not be discussed at length.

While the preferred embodiment of the invention has been illustrated and described, it will be appreciated that various changes can be made therein without departing from the spirit and scope of the invention.

The invention claimed is:

1. A method performed on a device, the method comprising:
configuring core components of the device, where the device including the configured core components is further configured for performing a role identified by a role manifest, where the role manifest is associated with the device and is processed by a role-management tool executed on the device to identify, build, and configure role-specific components corresponding to the role, and where the core components perform at least some functions specific to the role.

2. The method of claim 1 where the device including the configured core components is configured for performing basic functions of a networked device.

3. The method of claim 2 where the basic functions are selected from a set of functions including file handling, network access, account administration, and firewall functionality.

4. The method of claim 1 where the role is one of a plurality of roles, and where the device is capable of being configured to perform one or more of the plurality of roles.

5. The method of claim 1 where the role-specific components, once identified, built and configured on the device, are sufficient along with the configured core components to enable the device to perform the role corresponding to the role manifest.

6. At least one storage device storing computer-executable instructions that, when executed by a device, cause the device to perform actions comprising configuring core components of the device, where the device including the configured core components is further configured for performing a role identified by a role manifest, where the role manifest is associated with the device and is processed by a role-management tool executed on the device to identify, build, and configure role-specific components corresponding to the role, and where the core components perform at least some functions specific to the role.

7. The at least one storage device of claim 6 where the device including the configured core components is configured for performing basic functions of a networked device.

8. The at least one storage device of claim 7 where the basic functions are selected from a set of functions including file handling, network access, account administration, and firewall functionality.

9. The at least one storage device of claim 6 where the role is one of a plurality of roles, and where the device is capable of being configured to perform one or more of the plurality of roles.

10. The at least one storage device of claim 6 where the role-specific components, once identified, built and configured on the device, are sufficient along with the configured core components to enable the device to perform the role corresponding to the role manifest.

11. A device and at least one software module together configured for performing actions comprising configuring core components of the device where the device including the configured core components is further configured for performing a role identified by a role manifest, where the role manifest is associated with the device and is processed by a role-management tool executed on the device to identify, build, and configure role-specific components corresponding to the role, and where the core components perform at least some functions specific to the role.

12. The device and at least one software module of claim 11 where the device including the configured core components is configured for performing basic functions of a networked device.

13. The device and at least one software module of claim 12 where the basic functions are selected from a set of functions including file handling, network access, account administration, and firewall functionality.

14. The device and at least one software module of claim 11 where the role is one of a plurality of roles, and where the device is capable of being configured to perform one or more of the plurality of roles.

15. The device and at least one software module of claim 11 where the role-specific components, once identified, built and configured on the device, are sufficient along with the configured core components to enable the device to perform the role corresponding to the role manifest.

16. The method of claim 1, further comprising:
installing on the device, in response to the configuring of core components of the device, the role-specific components identified by the role manifest corresponding to a selected role for the device.

17. The at least one storage device of claim 6, further causing the device to perform actions comprising installing on the device, in response to the configuring of core components of the device, the role-specific components identified by the role manifest corresponding to a selected role for the device.

18. The device and at least one software module of claim 11, further configured for performing actions comprising installing on the device, in response to the configuring of core components of the device, the role-specific components identified by the role manifest corresponding to a selected role for the device.

* * * * *